United States Patent
Smith et al.

(10) Patent No.: US 7,716,137 B2
(45) Date of Patent: May 11, 2010

(54) SYSTEM AND METHOD FOR AUTOMATICALLY TRACKING AND ENABLING THE OPERATION OF A PRODUCT

(75) Inventors: Gregory J. Smith, Santa Clara, CA (US); Robert Paxton Scott, Sunnyvale, CA (US)

(73) Assignee: Nokia Inc., Irving, TX (US)

( * ) Notice: Subject to any disclaimer, the term of this patent is extended or adjusted under 35 U.S.C. 154(b) by 1442 days.

(21) Appl. No.: 10/218,198

(22) Filed: Aug. 13, 2002

(65) Prior Publication Data

US 2003/0036920 A1    Feb. 20, 2003

Related U.S. Application Data

(60) Provisional application No. 60/312,129, filed on Aug. 14, 2001, now abandoned.

(51) Int. Cl.
*G06F 17/00* (2006.01)
(52) U.S. Cl. .............. 705/52; 705/1; 705/51; 705/57; 380/201
(58) Field of Classification Search ............. 705/50–80, 705/1; 380/201
See application file for complete search history.

(56) References Cited

U.S. PATENT DOCUMENTS

| | | | | | |
|---|---|---|---|---|---|
| 5,375,240 | A | * | 12/1994 | Grundy | 726/28 |
| 5,790,664 | A | * | 8/1998 | Coley et al. | 709/203 |
| 5,864,620 | A | * | 1/1999 | Pettitt | 705/54 |
| 6,044,469 | A | * | 3/2000 | Horstmann | 726/29 |
| 6,073,124 | A | * | 6/2000 | Krishnan et al. | 705/59 |
| 6,108,420 | A | | 8/2000 | Larose et al. | 380/4 |
| 6,260,141 | B1 | * | 7/2001 | Park | 713/155 |
| 6,385,596 | B1 | * | 5/2002 | Wiser et al. | 705/51 |
| 6,389,403 | B1 | | 5/2002 | Dorak, Jr. | 705/52 |
| 6,389,538 | B1 | | 5/2002 | Gruse et al. | 713/194 |
| 6,697,948 | B1 | * | 2/2004 | Rabin et al. | 726/30 |

* cited by examiner

*Primary Examiner*—Calvin L Hewitt, II
*Assistant Examiner*—John M Winter

(57) ABSTRACT

System and method for automatically tracking and enabling the operation of a product. An order is received and information regarding the order, customer, and product is stored. A key is given to the customer to be used in registration. During registration, the key is provided and a candidate fingerprint obtained. If the candidate fingerprint matches the fingerprint of the ordered product, data is automatically sent to the product that enables the product to operate. In addition over time, status regarding the product is received and updates are sent to the product as needed or requested.

20 Claims, 9 Drawing Sheets

SYSTEM AND METHOD FOR AUTOMATICALLY TRACKING AND ENABLING THE OPERATION OF A PRODUCT

RELATED APPLICATION

This application is a Utility Patent application based on a previously filed U.S. Provisional Patent application, U.S. Serial No. 60/312,129 filed on Aug. 14, 2001, the benefit of the filing date of which is hereby claimed under 35 U.S.C. §119(e).

FIELD OF THE INVENTION

This invention relates generally to automated systems and methods for distributing product and, more specifically, to a system and method for tracking, enabling, and updating a product.

BACKGROUND

A product goes through many phases in its lifetime. After a design phase, a product is typically manufactured and prepared for distribution. The product may be shipped directly to a customer or it may be shipped to a reseller for sale to other resellers or customers. In the past, once a product left a manufacturing site, the product producer (hereinafter "vendor") had little if any information as to where the product was, to whom the product was sold, what the product was being used for, or the condition of the product. Vendors tried to determine some information about to whom the product was finally sold (hereinafter the "customer") by providing a warranty or registration card and requesting that the customer fill out the card and return it to the vendor. Many customers would simply fail to return the card or not provide the information requested (or would provide inaccurate information by mistake or otherwise). This left a gap in a vendor's knowledge regarding where the product ended up. In addition, if the customer failed to fill in the serial number of the product (or filled in an incorrect serial number), the vendor did not know which specific product the customer received.

Vendors provided incentives for returning completed cards such as a drawing for a free product or otherwise. This motivated some customers to return cards but still did not guarantee the correct entry of data regarding the product received. In addition, the card was typically the last communication received from the customer (unless something went wrong with the product). In general, the vendor did not know how the product was performing, whether it had errors, or otherwise.

With the Internet age and electronic and software products, some vendors provided electronic means for returning registration information. Although somewhat better than the paper cards returned, these means suffered many of the same problems—failure to register, incorrect information supplied, and lack of status updates regarding the product. In addition, electronic registration was susceptible to interception and information gathering by hackers and competitors of the vendor.

Furthermore, vendors who received registrations—electronic or otherwise—had no way of monitoring that a product was used as licensed. For example, a customer could buy a hardware/software combination in which the software was licensed to run on the shipped hardware only. The hardware could be a computing device of limited computing power and resources. The customer could install the software on a more powerful platform and register the software using the better platform. A vendor could not tell that the software was running on an unlicensed platform and had difficulty enforcing the license agreement in an automated way.

SUMMARY

A system and method addressing needs including those described above are provided. An order is received and information regarding the order, customer, and product is stored. A key is given to the customer to be used in registration. During registration, the key is provided and a candidate fingerprint obtained. If the candidate fingerprint matches the fingerprint of the ordered product, data is automatically sent to the product that enables the product to operate. In addition over time, status regarding the product is received and updates are sent to the product as needed or requested.

In one aspect of the invention, the fingerprint of the product is electronically readable by the product. In another aspect of the invention, the candidate fingerprint is obtained from the customer. The fingerprint may include a media access control (MAC) address of the product and a serial number. The candidate fingerprint may be obtained over a network by contacting the product and requesting the fingerprint directly from the product. In responding, the product may automatically read the candidate fingerprint (a fingerprint electronically readable by the product).

In another aspect of the invention, after sending the key to a registration Web site, a username and password is obtained to employ while registering the product. The key enables an association between the customer and sales information in a database accessible to the vendor.

In another aspect of the invention, errors that have occurred within the product are received and stored in a database accessible to the vendor. Then, the errors are correlated with a manufacturer that produced the product.

Aspects of the invention may employ version 1.0 or greater of the Hypertext Transport Protocol Secure (HTTPS) protocol to communicate between the product and a resource associated with the vendor.

In another aspect of the invention, a frequency that the product queries for updates is employed to determine whether the product has been duplicated.

In another aspect of the invention, previous to the expiration of the license, the customer is automatically informed of the pending expiration. A request to renew the license may then be received and data automatically provided to the product that enables the product to operate until the renewed license expires.

In another aspect of the invention, an order system receives orders from a customer, a registration system receives a request to register the product and determines whether an obtained candidate fingerprint matches the fingerprint that identifies the product, and a maintenance system automatically sends data to the product that enables the product to operate until a license associated with the product expires. Information may be stored in a customer relations management (CRM) database.

These and various other features as well as advantages, which characterize the present invention, will be apparent from a reading of the following detailed description and a review of the associated drawings.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, first an environment including an exemplary product that might be sold and tracking is described. Then, entities involved in a sales process and their interactions are discussed. Next, components involved in registering a product, licensing the product, and associating the registered product with a manufactured product are described. Then, an interaction between a database associated with the management of an appliance and a customer relations database is discussed. Next, components involved in a renewal sales process are described. Finally, a method for automatically tracking and enabling the operation of the product is disclosed.

Figure 1:
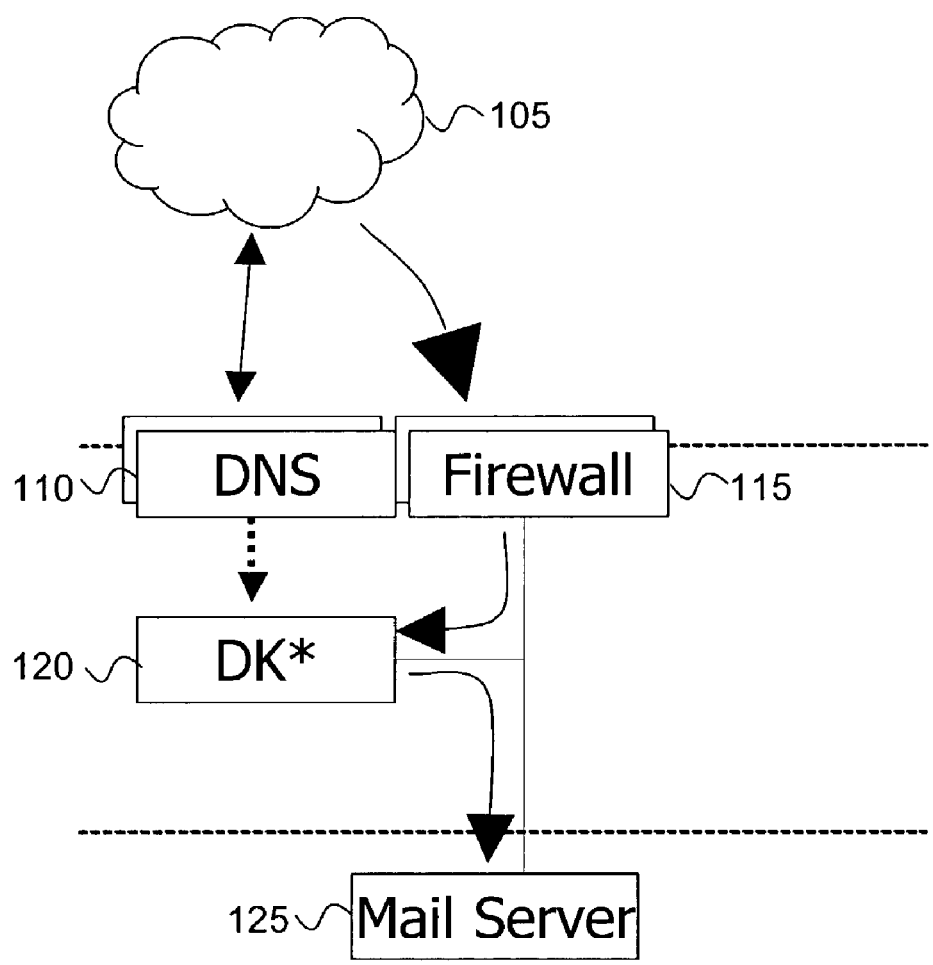
FIG. 1 illustrates an environment including an exemplary product that might be sold and tracked.

FIG. 1 illustrates an environment including an exemplary product that might be sold and tracked, according to one embodiment of the invention. The environment includes network 105, domain name system (DNS) server 110, firewall 115, DarkStar appliance 120, and mail server 125. Network 105 is coupled to firewall 115 and DNS server 110 over a network. Likewise, DNS server 110 and firewall 115 are coupled to DarkStar appliance 120 over a network. DarkStar appliance 120 is also coupled to mail server 125 over a network.

Most frequently, the term "product" refers to a device capable of executing instructions, such as a computer, an appliance, a mechanical device, a collection of such devices, or the like. Sometimes, product may refer to a device and/or the instructions that execute on the device. The instructions that execute on a product may also be called software product or simply software. Thus, product may refer to a device, a device and its associated software, or just the software that executes on the device.

Network 105 may be any type of network by which information can pass from one node to another. An exemplary network is the Internet. Mail messages (in the form of SMTP traffic or otherwise) may be passed from nodes coupled to network 105 (not shown) to firewall 115. Firewall 115 may make an initial determination as to whether to pass the message to DarkStar appliance 120 or to prevent the message from passing through firewall 115. Firewall 115 operates as firewalls known by those skilled in the art.

DarkStar appliance 120 may be, for example, a virus scanning network appliance. DarkStar appliance 120 may receive a message that passes through firewall 115. DarkStar appliance 120 may then scan the message for any computer viruses (also known as exploits). It may also perform other checks to determine whether to pass the message to a mail server. DarkStar appliance 120 may employ DNS server 110 to obtain further information regarding the message, such as whether the message was sent from a node in the domain the message indicates it was sent from.

To aid in scanning for viruses, DarkStar appliance 120 may receive frequent virus scan updates from a device coupled to network 105. DarkStar appliance 120 may include multiple Ethernet ports each port having a media access control (MAC) address. These ports may be used, for example, to receive and transmit messages. DarkStar appliance 120 may be implemented using special purpose components and/or a conventional computer system having one or more processors. DarkStar appliance 120 may also include software. DarkStar appliance 120 is one example of a product.

Mail server 125 is any device capable of delivering mail to other nodes. Such a device may use, for example, SendMail or a proprietary mail delivery solution.

Figure 2:
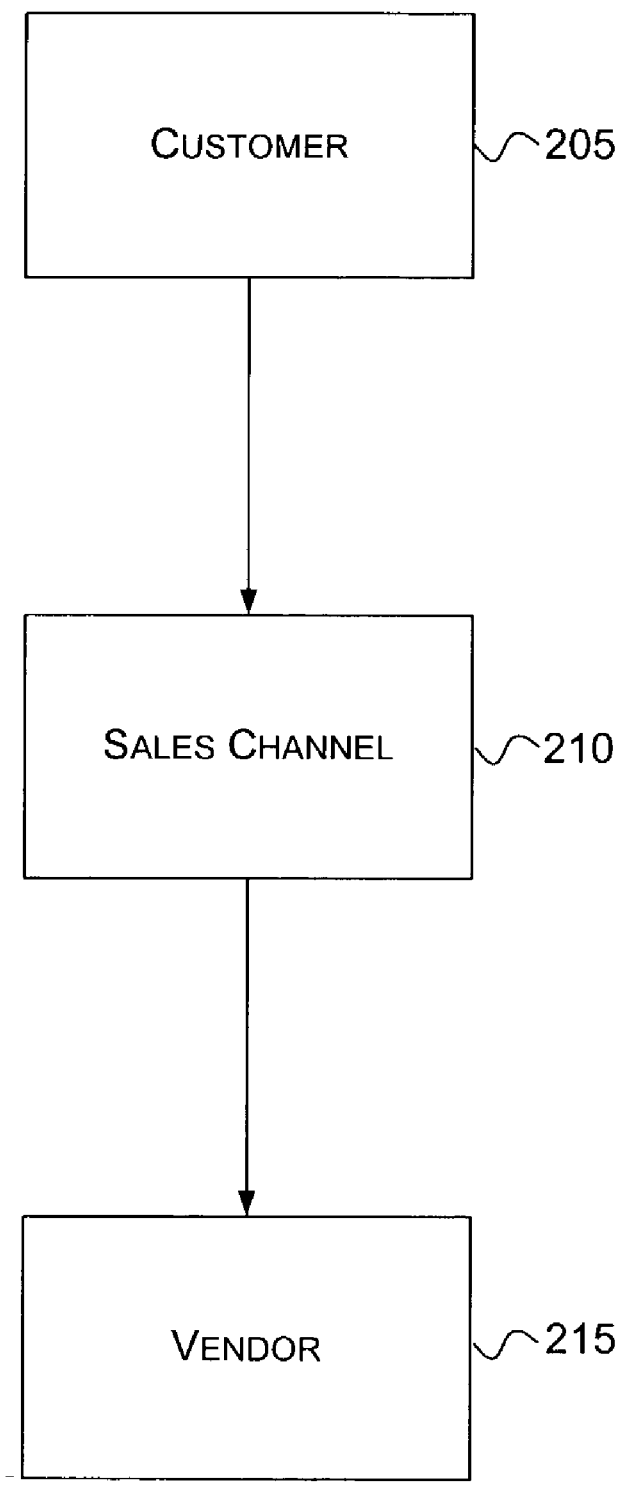
FIGS. 2-3 show entities involved in a sales process.
Figure 3:
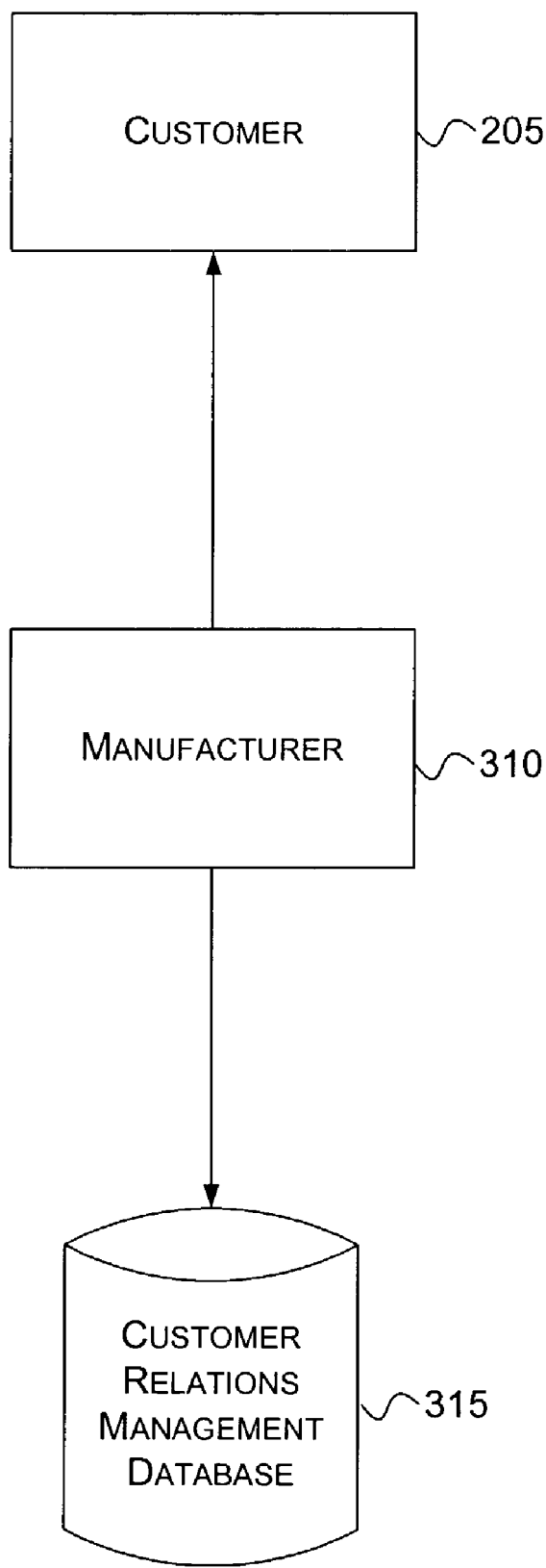

FIGS. 2-3 show entities involved in a sales process, according to one embodiment of the invention. Referring to FIG. 2, customer 205 places an order through sales channel 210. During the sales, information about customer 205 is collected. This information might include, for example, company information, contact information, etc. Information regarding what products customer 205 ordered may also be collected and associated with the sale. Customer 205 may be given a one time key with which to log onto a Web site and register each product. When an agent of customer 205 logs onto the Web site, the agent may be prompted to enter the key. Upon entering the key, the agent may then be prompted to create a user name and password.

In addition, sales channel 210 may forward to vendor 215 information collected during the sales together with the key given to the agent to register the product. Vendor 215 may host the registration Web page. When customer 205 registers the product and enters the key, vendor 215 may form an association between customer 205 and the user name using the key and the customer data previously forwarded from sales channel 210. This association may be stored in a database for future use.

Referring to FIG. 3, a vendor may have contracted with hardware manufacturer 310, such as Jabil Circuit, to produce products for the vendor. The vendor may instruct the hardware manufacturer to collect a fingerprint or unique key from each product manufactured. The fingerprint might include, for example, a serial number of the product together with the MAC address of the first Ethernet port of the product. It might also or alternatively include a central processing unit (CPU) identifier (ID) and serial number such as those placed on some Pentium® CPUs. Preferably the identifier chosen can be read by the product itself. That is, an ideal identifier is one that the product may read without user interaction. The identifier stored in a CPU, as a MAC address, or in a non-volatile memory associated with the product are some examples of identifiers that can be read by the product itself.

The vendor may instruct the hardware manufacturer to forward fingerprints from products produced to the vendor. The vendor may then store these fingerprints in a customer relations management (CRM) database accessible to the vendor, such as customer relations management database 315. A CRM database that might be used, for example, is one known as Vantive.

In addition, the vendor may instruct the hardware manufacturer to send an ordered product to a customer, such as customer 205, who placed an order through a sales channel. It will be recognized that the above model is not the only way in which product may be distributed to a customer. For example, the product may be housed in a warehouse or at a retailer or reseller. In response to a customer order, the retailer or reseller may ship the product to the customer. Other distribution channels and models may also be employed to distribute product to a customer without departing from the spirit or scope of the invention.

Figure 4:
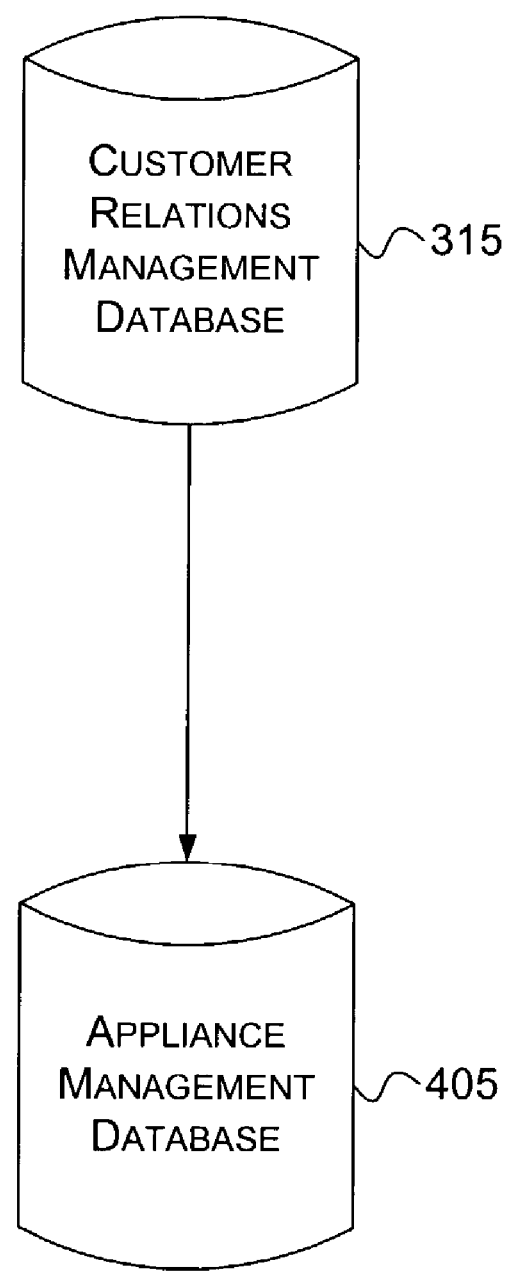
FIGS. 4-5 show components involved in registering a product, licensing the product, and associating the registered product with a manufactured product.
Figure 5:
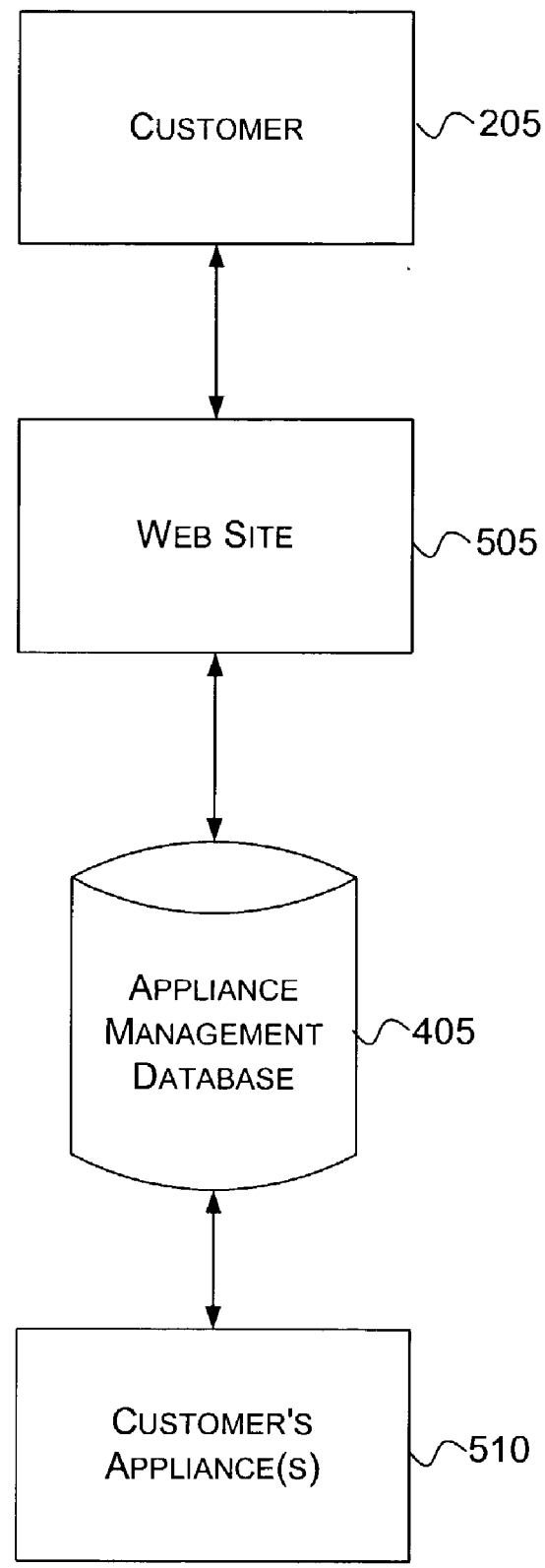

FIGS. 4-5 show components involved in registering a product, licensing the product, and associating the registered product with a manufactured product, according to embodiment(s) of the invention. Referring to FIG. 4, two databases are shown—CRM database 305 and appliance management database 405. As described in conjunction with FIG. 3, CRM database 305 receives fingerprints. Each fingerprint is associated with a particular manufactured product, such as a network appliance. After CRM database 305 obtains one or more fingerprints associated with manufactured products, CRM database 305 forwards the fingerprints to appliance management database 405. As will be described below, this allows appliance management database 405 to associate a registered product with a fingerprint during registration.

Appliance management database 405 may be used to register manufactured products, such as appliances, to provide registered products with keys that allow the registered products to operate, and to provide the registered products with updates. For example, a network appliance set up as an antivirus product may need frequent virus scanner updates. Appliance management database 405 may be used to provide these updates and record when such updates were provided or applied.

Referring to FIG. 5, after a customer, such as customer 205, has received an ordered product, the customer interacts with Web site 505 to register customer's appliance(s) 510 with appliance management database 405. As described in conjunction with FIG. 2, at the time of sale, a customer may receive a key. The customer may use this key when accessing Web site 505. Upon accessing Web site 505, the customer may be asked to provide a username and password. Because the sales channel forwarded the key together with customer and sales information to the vendor, the vendor now has a link between a customer, sales information, and a user name. The customer may enter information that allows appliance management database 405 to locate customer's appliance(s) 510. This information may include, for example, an Internet Protocol (IP) address or other address information. Appliance management database 405 may use the address to locate and connect with customer's appliance(s) 510. After connection, appliance management database 405 may query customer's appliance(s) 510 for fingerprint(s).

When registering, customer 205 may indicate that software ordered with or separately from a product has been installed on a particular product by indicating the product's IP address, serial number, and/or some other identifier. One of four cases may occur when trying to match the fingerprint to a product sold to customer 205.

First the fingerprint may not match the product on which the software should have been installed but may match another of the products sold to customer 205. For example, a customer may order five products of product X and five products of product Y. With each of the products may come software that needs to be installed on the associated product. A customer may have software that is supposed to be installed on product X that the customer instead installs on product Y. Product Y may not have the same computing power as product X. Appliance management database 405 may record that the customer installed the software on a product that customer bought (and for which appliance management database 405 has a fingerprint associated with the customer). Appliance management database 405 may also flag that the customer installed the software on the wrong product.

Second the fingerprint may not match the product on which the software should have been installed but may match another identical product sold to customer 205. For example, the fingerprint may match $X_1$'s fingerprint (one of the five X products), but the software was installed on $X_2$ (another of the five X products). This is generally not a problem since both Xs are identical. In this case, appliance management database 405 may associate the software with $X_2$ since the customer purchased $X_2$ and there should be no problem running the software on $X_2$.

Third the fingerprint may not be found in the database. Customer 205 may try to install software on a device of greater capacity than the product sold to customer 205. A license may indicate that customer 205 is only licensed to install the software on the product sold to customer 205 from the vendor. In this case, appliance management database 405 may refuse to give the key that allows the software to run on the other product.

Fourth, the software may be installed on the correct product. That is, the product has a fingerprint that matches the fingerprint of the product on which the software is supposed to be installed. In other words, using the example above, the software may have been installed on product $X_1$ and product $X_1$ also happens to be the appliance that has a fingerprint that matches the fingerprint associated with the purchase. In this case, appliance management database 405 may provide a key that allows the software to run on the appliance.

If the customer installs the software on a product on which the customer is authorized to install the software, appliance management database 405 may enable the product to operate by providing it a key that allows it to operate. In addition, appliance management database 405 may provide the product with any updates available. After receiving updates, the product may reboot and begin operation.

A key may enable a product to operate in the following manner. A component on a product may determine which actions and/or software the product may execute. The component may query a database or data structure accessible to the product to see which keys have been installed on the product and which have not. Each key may correspond to a program or options that the product is allowed to execute. A key may be revalidated each time a request to run a program associated with the key is received. That is, the key may be checked to determine whether the key includes a correct digital signature or some other indicator that indicates that the key is authentic. In addition, a key may include an expiration date after which the key is no longer valid. If the key is valid and has not expired, this may be used to indicate that certain software or actions may be executed on the product.

Figure 6:
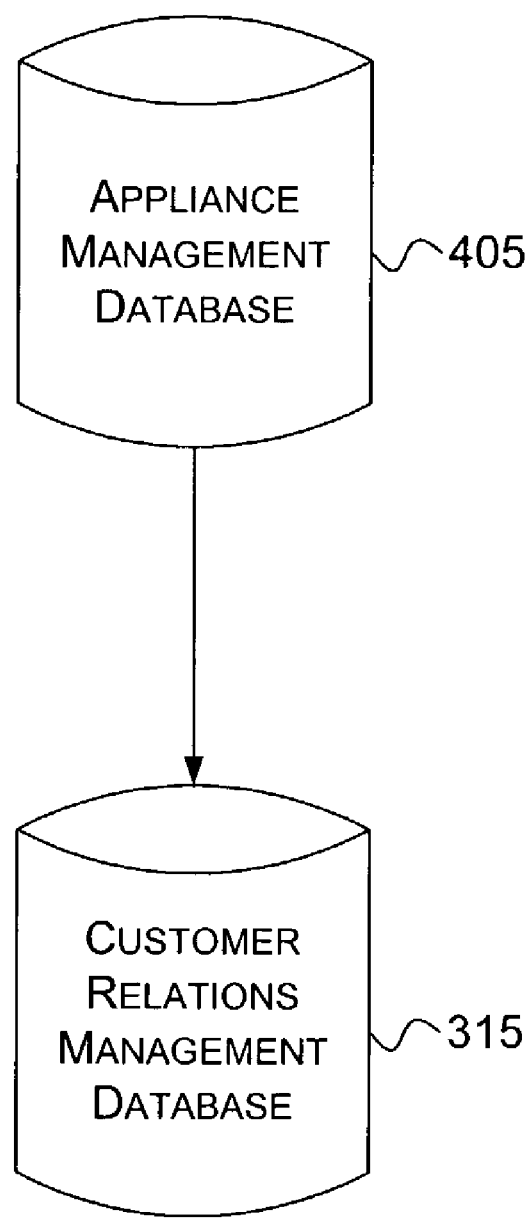
FIG. 6 shows an interaction between a database associated with the management of an appliance and a customer relations database.

FIG. 6 shows an interaction between a database associated with the management of a product and a customer relations database, according to one embodiment of the invention. Appliance management database 405 may propagate information regarding the registration and updates to CRM database 315. This may occur shortly after registration and at other selected or periodic times. This may allow customer support, for example, to know that the customer has installed the product and when the customer receives updates.

In addition, a product the customer has installed may periodically contact appliance management database 405 to check on the availability of updates. Appliance management database 405 may send a log of these requests to CRM database 315. This may be used for many purposes. It may be used by a sales force to determine which products are being used by which customers. It could be used to determine which products have stopped connecting to appliance management database 405. It might be used to determine if someone has duplicated a product. For example, someone might create another product that has the same fingerprint as a sold product. Each product may be configured to contact appliance management database 405 once every 15 minutes. (This may be the maximum frequency at which a product may contact appliance management database 405.) If appliance management database 405 is consistently contacted by a particular product more frequently than every 15 minutes, this may signal that the product has been duplicated.

Duplicating a product may refer to duplicating some or all of the hardware of a product, some or all of the software of a product, or some or all of both the hardware and software of a product. For example, all or just the fingerprint portions of a product may be duplicated so that when a product requests an update or registration (and an appliance management database requests a fingerprint), a recognized fingerprint is sent to the appliance management database. Such duplication may be detected by employing the technique outlined above.

Data collected might also be used to determine failure rates and correlate these failure rates to manufacturers. For example, each product may do internal checks to determine whether its systems are operating appropriately. When connecting with appliance management database 405, a product may report information regarding its internal error checking. This information could then be used to determine failure rates.

A product may communicate with appliance management database 405 using Hypertext Transfer Protocol Secure (HTTPS). HTTPS may be used to provide a secure channel for communicating status and update information. It may also provide a convenient mechanism for communicating with the product when the product is located behind a firewall.

When an update is available, several actions may be taken. These actions may be configurable by a customer and/or vendor. One action may be that an alert is not given. Some customers may prefer to not be bugged each time a new update is available. Rather, they may prefer to proactively look for a new update rather than being constantly informed when a new update is available.

Another action is that a customer may be given an alert when a new update is available. Then, to retrieve the update, the customer may explicitly request that the update be downloaded and applied.

Another action is that a product may check for updates and automatically download them but not apply them without explicit customer approval. Some companies, such as financial and government institutions, require testing of each new upgrade before applying the upgrade on production servers.

Another action is that a product may check for updates, automatically download them, and automatically apply them. This may be ideal, for example, with products that provide anti-virus protection. New viruses may be created and released at any time. A customer may desire that the customer's product automatically retrieve and apply any new anti-virus protection updates as soon as possible.

Applying an update may refer to one or more actions associated with installing the update. For example, first the update may be validated to ensure that it comes from a recognized and authorized provider. This may be done, for example, by using a digital signature included with or sent with the update to ensure that the update was sent from a particular entity and that the update has not been tampered with or corrupted in any way. An update may be sent in a compressed format. Applying the update may involve uncompressing the update. Applying the update may also involve installing the update.

Applying an update may also involve testing to make sure that functionality of a product has not been damaged. For example, if a product significant slows down after installing an update, this may indicate that functionality of the product has been damaged. As another example, if a product fails to respond in a predetermined way to certain requests after an update has been installed, this may also indicate that functionality of the product has been damaged.

It will be recognized that other actions could also be taken without departing from the spirit or scope of the invention.

Figure 7:
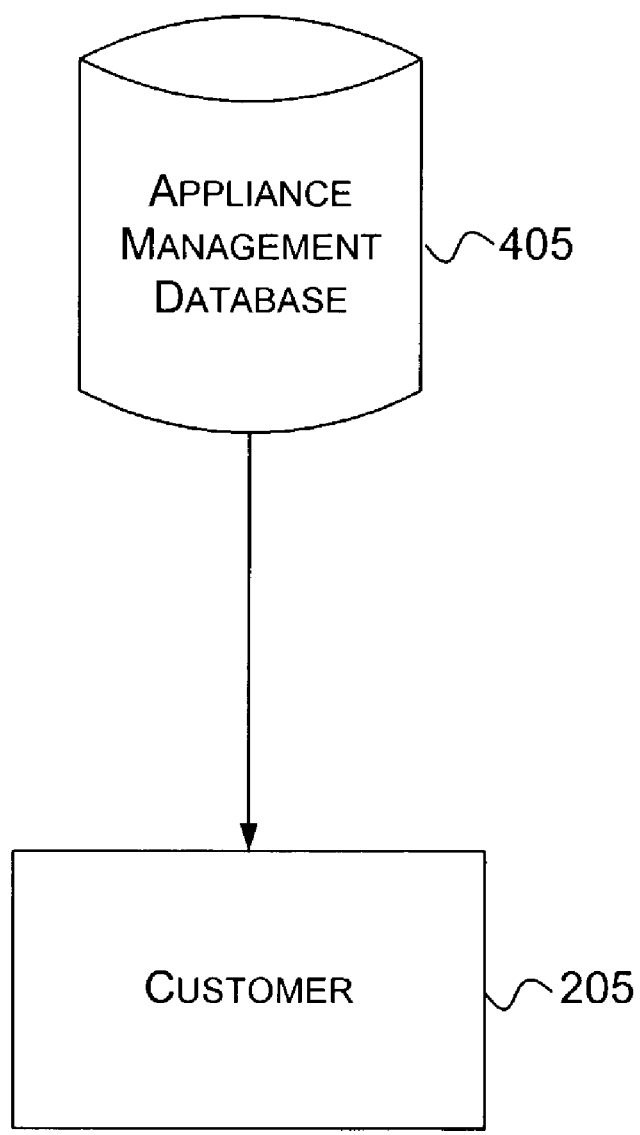
FIGS. 7-8 show components involved in a renewal sales process.
Figure 8:
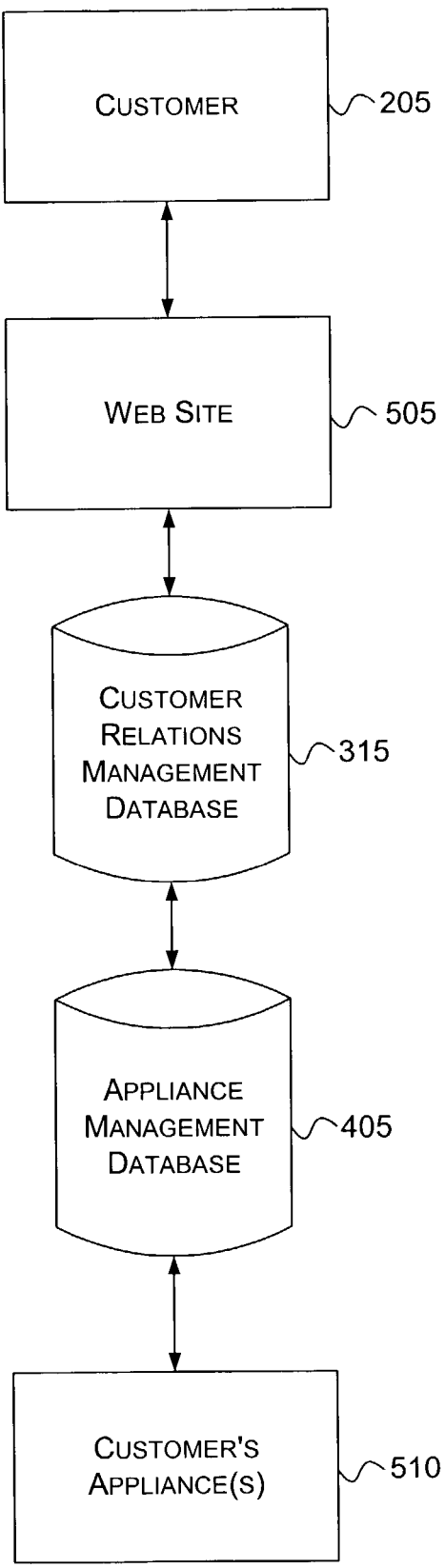

FIGS. 7-8 show components involved in a renewal sales process, according to one embodiment of the invention. Referring to FIG. 7, appliance management database 405 may be used to inform customer 205 of a pending expiration of a software license. For example, 60 days before the expiration of a software license, appliance management database 405 could contact customer 205 to inform the customer of the pending expiration. Contact could be made when a product that had a license soon to expire contacted appliance management database 405. Information regarding the pending license expiration could be transferred to the product and placed in a notices or alert area for the customer to view. Alternatively, or in addition, an email or mail could be sent to the customer to inform the customer of the pending expiration. Alternatively, a sales representative could contact the customer to inquire regarding the pending expiration and to solicit the purchase of a renewal.

In addition, the product itself typically knows how long it has left before its license expires. As the period of expiration approaches, the product may inform an operator who logs onto the product how much longer is left on the license. The product may also give a link to a Web site at which the customer could renew the license.

Referring to FIG. 8, customer 205 may interact with Web site 505 to renew a license on customer's appliance(s) 510. Customer 205 may use the same username and password that was used when customer 205 registered customer's appliance(s) 510. After customer 250 has renewed one or more licenses, Web site 505 transfers renewal information to a vendor's internal database, such as CRM database 315.

CRM database 315 may propagate renewal information to appliance management database 405 which then may renew the license with customer's appliance(s) 510. CRM database 315 may also receive renewal information from other sources. For example, customer 205 may call the reseller or retailer at which customer 205 ordered customer's appliance(s) 510. The reseller or retailer may assist customer 205 in obtaining a renewal and may gather sufficient information to transmit to CRM database 315 to indicate for which appliances customer 205 is requesting renewal licenses. Upon receipt of the information, CRM database 315 may propagate renewal information to appliance management database 405 which may then renew the license with customer's appliance(s) 510.

Figure 9:
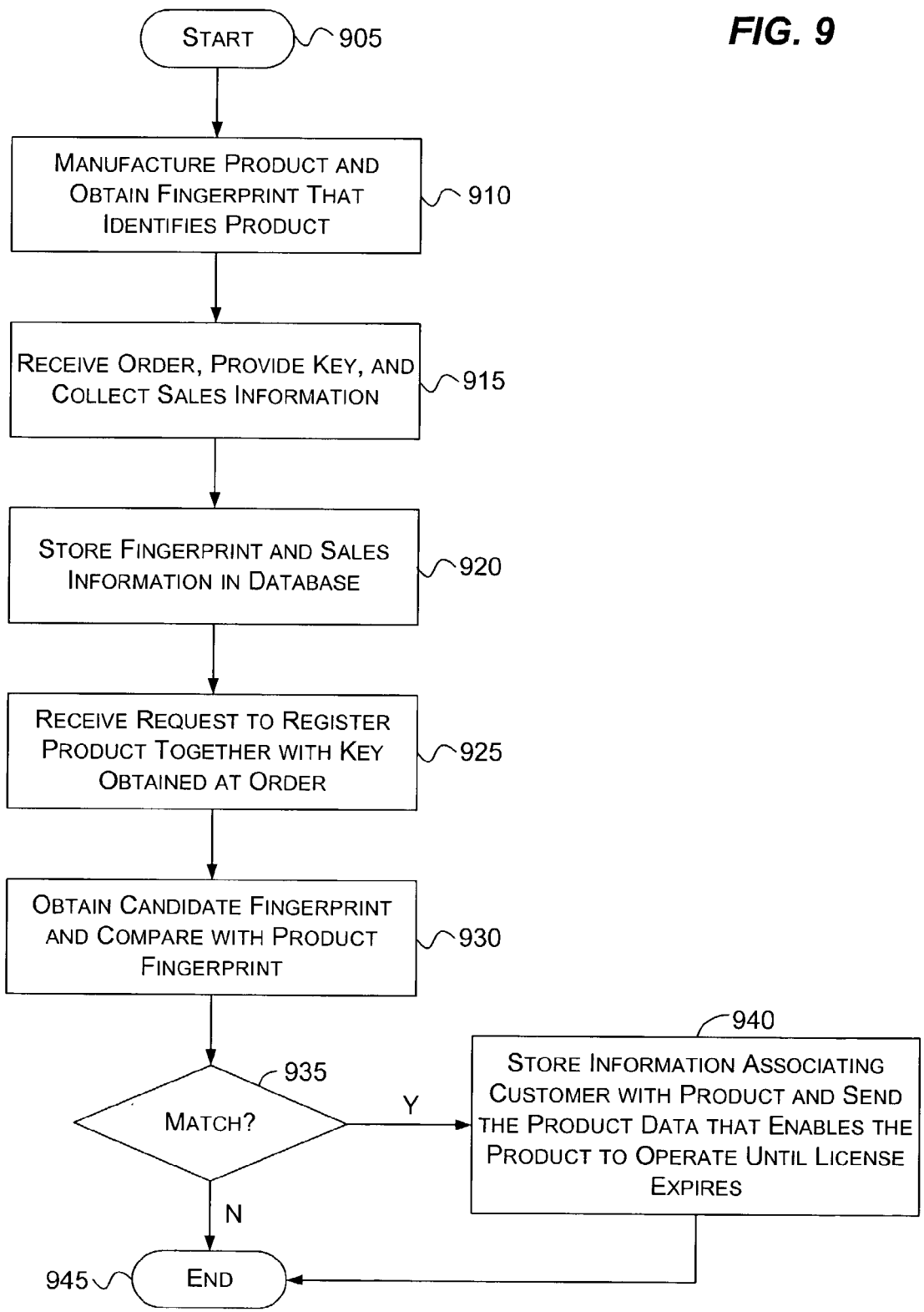
FIG. 9 illustrates a flow chart showing a method for automatically tracking and enabling the operation of the product in accordance with the invention.

FIG. 9 illustrates a flow chart showing a method for automatically tracking and enabling the operation of the product, according to an embodiment of the invention. The process begins at block 905 before a product is manufactured that needs to be tracked and enabled. After block 905, processing continues at block 910.

At block 910, the product is manufactured and a fingerprint that identifies the product is obtained. The fingerprint may include data electronically readable by the product as described in conjunction with FIG. 3. The fingerprint may be obtained by the manufacturer and forwarded to the vendor for association with other data. After block 910, processing continues at block 915.

At block 915, an order is received, a key is provided to the customer, and sales information regarding the order is collected. As described previously, the order may be made through a Web site or through a reseller or retailer of the product. At the time of the order or sometime thereafter a key is provided to the customer. In addition, as described previously, information regarding the customer, the product, and the order may be obtained and stored for future use. After block 915, processing continues at block 920.

At block 920, the fingerprint and sales information is stored in a database. For example, referring to FIG. 3, this data could be stored in CRM database 315. After block 920, processing continues at block 925.

At block 925, a request to register the product is received. The request to register is accompanied by the key previously given to the customer during the order process. When the key is provided, the customer is prompted to enter a username and password. The username and password can then be used for future interactions with the system. In addition, the key allows the request to be associated with the customer, product, and order information previously obtained. After block 925, processing continues at block 930.

At block 930, a candidate fingerprint is obtained and compared with the product fingerprint. "Candidate" fingerprint refers to a fingerprint supplied by the customer or by the product the customer is registering. Until this fingerprint is compared with the product purchased by the customer, it is uncertain whether the customer is authorized to register the product associated with the candidate fingerprint. After block 930, processing continues at block 935.

At block 935, the candidate fingerprint is compared with the fingerprint of the product ordered by the customer. If the two fingerprints match, processing continues at block 940; otherwise, processing continue at block 945.

At block 940, information associating the customer with the product is stored and the product is sent data, such as a key, that enables the product to operate until a license associated with the product expires. For example, referring to FIG. 5, appliance management database 405 sends customer's appliance(s) 510 one or more keys that enable customer's appliance(s) 510 to operate. After block 940, processing continues at block 945.

At block 945, processing ends. At this point, a product has been manufactured and a fingerprint of the product obtained. An order has been received, a key provided, and sales information collected. The fingerprint and sales information has been stored in a database. A request to register the product has been received together with the key obtained at the order. A candidate fingerprint has been obtained and compared with the fingerprint of the product. If they match, information associating the customer with the product has been stored and the product has been sent data, such as a key that enables the product to operate until a license associated with the product expires.

This process may be repeated for each product for which automatic tracing and enablement of product operation are desired.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. method for automatically tracking and enabling operation of a product, comprising:
   receiving, by a management computer, a fingerprint that identifies the product;
   receiving, by the management computer from a first computer, an order for the product;
   receiving, by the management computer, sales information for the product;
   sending a key from the management computer to the first computer;
   storing, by the management computer, the fingerprint and the sales information;
   receiving, by the management computer from the first computer, a request to register the product, the request including the key;
   sending, from the management computer to the product via a second computer, a request for a candidate fingerprint of the product;
   receiving the candidate fingerprint by the management computer from the product via the second computer; and
   determining, by the management computer, that the candidate fingerprint matches the fingerprint that identifies the product; and
   sending data from the management computer to the product via the second computer that enables the product to operate.

2. The method of claim 1, wherein the fingerprint that identifies the product is electronically readable by the product.

3. The method of claim 1, wherein the fingerprint that identifies the product includes one or more of a media access control (MAC) address of the product or a serial number of the product.

4. The method of claim 1, further comprising:
   receiving a request from the product requesting whether any updates are available; and in
   response to the request, performing at least one of alerting the customer of an update, downloading the update, and applying the update.

5. The method of claim 1, further comprising:
   receiving the fingerprint that identifies the product from the product and information that indicates errors that have occurred within the product;
   storing the received information in the database accessible to the vendor; and
   automatically correlating the errors with a manufacturer of the product.

6. The method of claim 1, wherein version 1.0 or greater of Hypertext Transfer Protocol Secure (HTTPS) is employed for each communication between the product and the management computer, the management computer being associated with a vendor of the product.

7. The method of claim 1 wherein the first and second computers comprise the same computer.

8. The method of claim 1 wherein the first computer comprises a customer computer, and the second computer comprises a customer appliance or other computer that includes the product.

9. The method of claim 1 wherein the sending, from the management computer to the product via a second computer, a request for a candidate fingerprint of the product comprises the management computer contacting the product over a network and requesting the candidate fingerprint directly from the product.

10. The method of claim 1 wherein the product comprises a manufactured or hardware product.

11. The method of claim 1 wherein the product comprises a software product.

12. An apparatus for tracking and enabling operation of a product comprising:
   a first management computer including a first processor and a memory storing instructions that when executed by the first processor cause the first processor to perform the steps of: receiving a fingerprint that identifies the product, receiving an order for the product from a first customer computer, receiving sales information for the product, sending a key to the first customer computer, and storing the fingerprint, the key and the sales information;
   a second management computer including a second processor and a memory storing instructions that when executed by the second processor cause the second processor to perform the steps of: receiving the fingerprint, the key and sales information from the first management computer, receiving a request from a second customer computer to register the product, the request including the key, sending to the product via a second customer computer, a request for a candidate fingerprint of the product, receiving the candidate fingerprint from the second customer computer, determining that the candidate fingerprint matches the fingerprint that identifies the product, and sending data to the product via the second computer that enables the product to operate.

13. The apparatus of claim 12 wherein the product includes a hardware or manufactured product.

14. The apparatus of claim 12 wherein the product is a software product.

15. The apparatus of claim 12 wherein the first management computer includes at least a customer relations management database.

16. The apparatus of claim 12 wherein the first and second management computers comprise a computer that includes at least a product (or appliance) management database.

17. The apparatus of claim 12 wherein the first management computer includes an order system, and the second management includes a product (or appliance) management database.

18. The apparatus of claim 12 wherein the memory of the first computer further storing instructions that when executed by the first processor cause the first processor to perform the steps of: receiving a customer's order for the product, placing an order for the product with a manufacturer, and receiving a fingerprint that identifies the product from the manufacturer.

19. The apparatus of claim 12 wherein the first customer computer and the second customer computer are the same computer.

20. The apparatus of claim 12 wherein the second processor of the second management computer performing the step of sending data to the product comprises the second processor of the second management computer sending data to the product that enables the product to operate until a license associated with the product expires, the memory of the second computer further storing instructions that when executed by the second processor cause the second processor to perform the steps of:
   informing the customer of a pending expiration of the license;
   receiving from the customer a request to renew the license; and
   sending data to the product that enables the product to operate until the renewed license for the product expires.

* * * * *